United States Patent

Prasad et al.

[11] Patent Number: 5,383,956
[45] Date of Patent: Jan. 24, 1995

[54] START-UP AND SHUT DOWN PROCESSES FOR MEMBRANE SYSTEMS AND MEMBRANE SYSTEMS USEFUL FOR THE SAME

[75] Inventors: Ravi Prasad, East Amherst; Pauline J. Cook, Kenmore, both of N.Y.

[73] Assignee: Praxair Technology, Inc., Danbury, Conn.

[21] Appl. No.: 134,023

[22] Filed: Oct. 12, 1993

[51] Int. Cl.⁶ .................................................. B01D 53/22
[52] U.S. Cl. ............................................. 95/45; 95/52; 96/9
[58] Field of Search ................... 95/45, 47, 52; 96/7–9

[56] References Cited

U.S. PATENT DOCUMENTS

| | | | |
|---|---|---|---|
| 3,442,002 | 5/1969 | Geary, Jr. et al. | 96/8 X |
| 4,119,417 | 10/1978 | Heki et al. | 96/8 X |
| 4,140,499 | 2/1979 | Ozaki et al. | 96/8 X |
| 4,264,338 | 4/1981 | Null | 95/47 |
| 4,718,921 | 1/1988 | Makino et al. | 95/52 |
| 4,881,953 | 11/1989 | Prasad et al. | 55/16 |
| 4,931,070 | 6/1990 | Prasad | 55/16 |
| 4,944,776 | 7/1990 | Keyser et al. | 55/16 |
| 4,952,219 | 8/1990 | DiMartino, Sr. | 55/16 |
| 5,002,590 | 3/1991 | Friesen et al. | 95/52 |
| 5,030,251 | 7/1991 | Rice et al. | 55/16 |
| 5,084,073 | 1/1992 | Prasad | 95/52 |
| 5,102,432 | 4/1992 | Prasad | 55/16 |
| 5,108,464 | 4/1992 | Friesen et al. | 95/52 |
| 5,125,937 | 6/1992 | Sadkowski et al. | 96/8 |
| 5,131,929 | 7/1992 | Brockmann et al. | 55/16 |
| 5,160,514 | 11/1992 | Newbold et al. | 95/52 X |
| 5,169,412 | 12/1992 | Prasad et al. | 55/16 |
| 5,185,014 | 2/1993 | Prasad | 96/9 X |
| 5,205,842 | 4/1993 | Prasad | 95/47 |
| 5,236,474 | 8/1993 | Schofield et al. | 95/52 X |
| 5,240,472 | 8/1993 | Sircar | 95/52 |
| 5,259,869 | 11/1993 | Auvil et al. | 95/52 |
| 5,281,253 | 1/1994 | Thompson | 95/45 X |
| 5,314,528 | 5/1994 | Monereau | 96/7 X |

FOREIGN PATENT DOCUMENTS

| | | | |
|---|---|---|---|
| 0430304 | 8/1991 | European Pat. Off. | |
| 3-245812 | 11/1991 | Japan | 95/52 |

*Primary Examiner*—Robert Spitzer
*Attorney, Agent, or Firm*—Chung K. Pak

[57] ABSTRACT

The present invention relates to processes and apparatuses for starting up and shutting down membrane gas separation systems comprising at least one gas separation membrane module and at least one membrane dryer module.

20 Claims, 2 Drawing Sheets

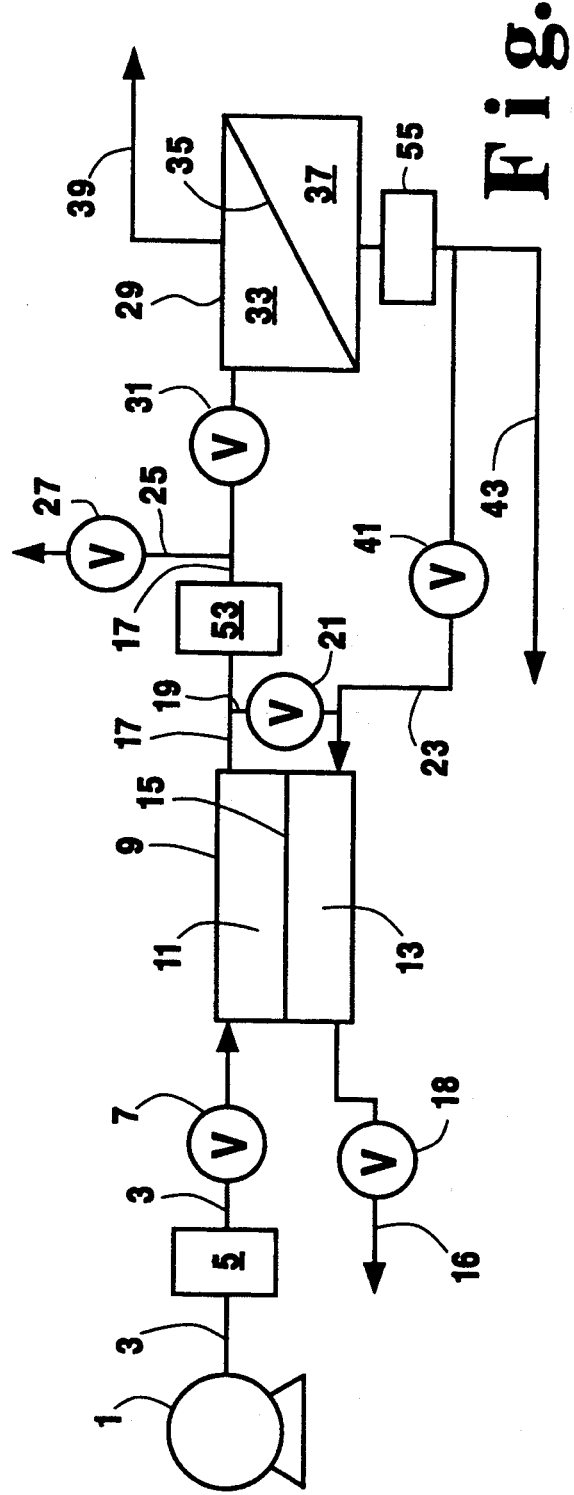

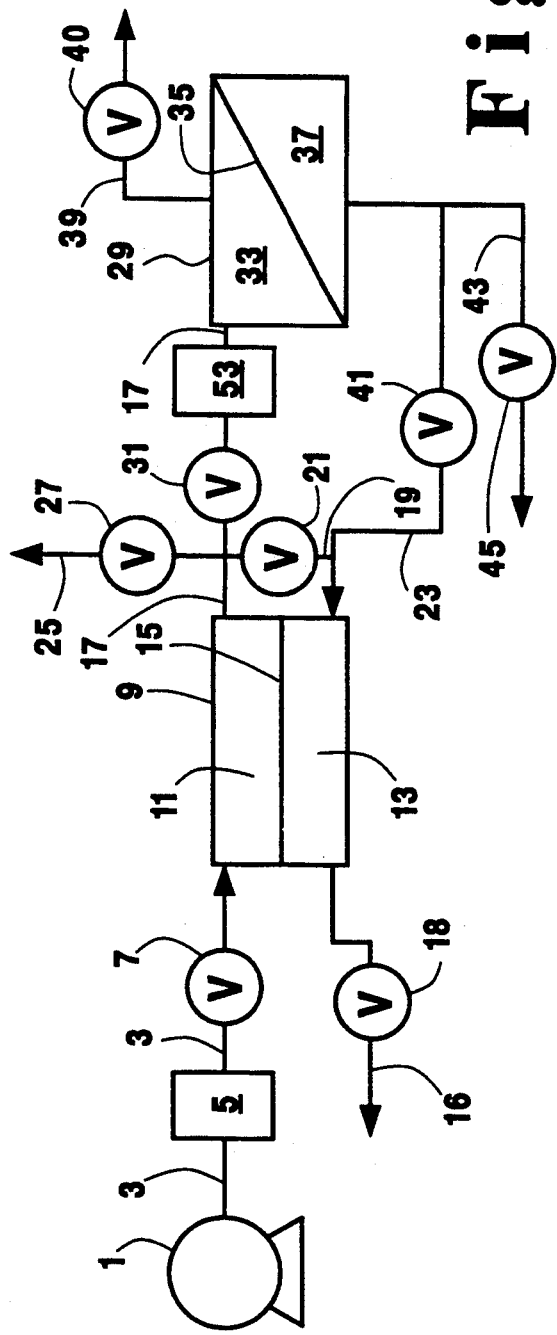
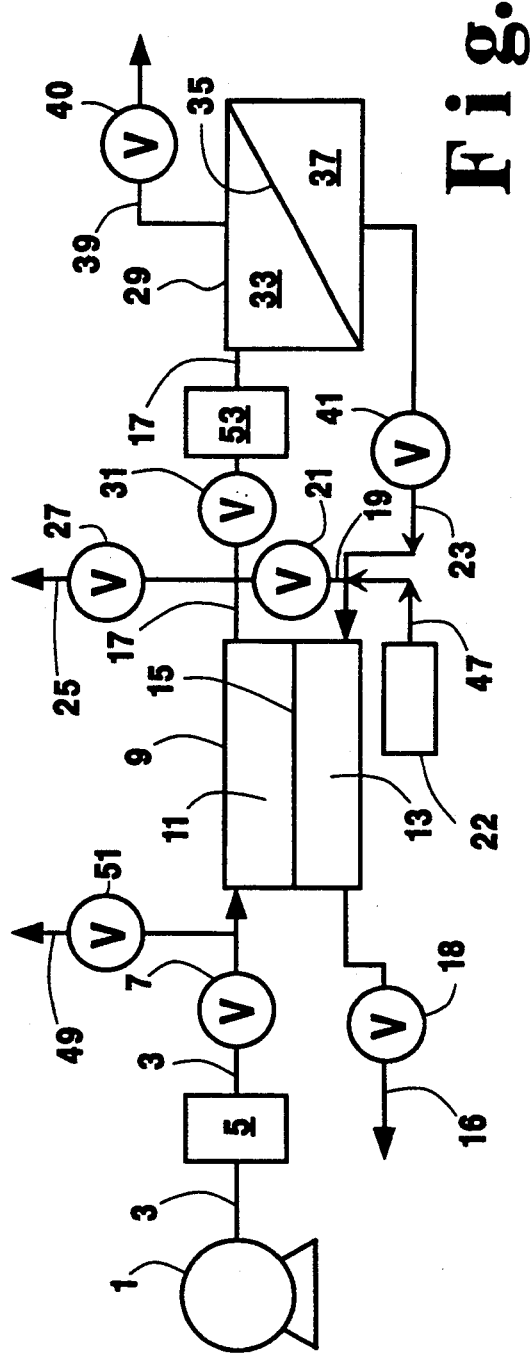
Fig. 3
Fig. 4

START-UP AND SHUT DOWN PROCESSES FOR MEMBRANE SYSTEMS AND MEMBRANE SYSTEMS USEFUL FOR THE SAME

FIELD OF THE INVENTION

The present invention relates to processes and apparatuses for starting up and shutting down membrane gas separation systems comprising at least one gas separation membrane module and at least one membrane dryer module.

BACKGROUND OF THE INVENTION

Permeable membrane process and systems have been increasingly employed in gas separation operations. In such operations, a gas mixture is fed into the nonpermeate side of at least one gas separation. membrane module under pressure. Upon contacting the surface of the membrane in the nonpermeate side of at least one gas separation membrane module, a more readily permeable component of the gas mixture passes or permeates through the membrane. The resulting permeated gas component is recovered or removed from the permeate side of the gas separation membrane module while the remaining unpermeated gas component is removed or recovered from the nonpermeate side of the gas separation membrane module. Commonly, these gas separation processes and systems are started up by passing and venting a compressed gas stream into and from the nonpermeate side of at least one gas separation membrane module until the desired steady state operating pressure, temperature and product purity are reached.

The gas mixture fed to the gas separation membrane module, however, may contain a substantial amount of moisture and may cause corrosion and condensation in instrumentation, piping, pneumatic tools, ventilators and other equipment associated with the gas separation membrane module. In certain instances, it may also lead to inferior performance of the gas separation membrane module and/or other equipement, such as adsorption traps. To prevent such problems, a membrane dryer module is employed to provide a dry gas to the gas separation membrane module. Many of these arrangements use waste permeate gas stream from the permeate side of the gas separation membrane module to purge the permeate side of the membrane dryer module during steady state operations. European patent application 0430304, U.S. Pat. No. 5,169,412 and U.S. Pat. No. 4,931,070, for example, describe steady state operation of an air separation system with a membrane dryer module.

Conventional membrane dryer module start-up methods include feeding a compressed gas into the nonpermeate side of a membrane dryer module and using at least a portion of the resulting product from the nonpermeate side to purge the permeate side of the membrane dryer module. U.S. Pat. 5,131,929 describes a startup method for a membrane drying module in which the inlet to the dryer module is brought to a specified minimum pressure prior to allowing gas to flow into the nonpermeate side of the dryer module. The dryer module is then operated dead ended until the pressure in the dryer module reaches the operating pressure (higher than the minimum inlet pressure). During this time, all of the gas is permeated or passed to the permeate side of the dryer module. This allows the dryer module to be started up and reach the desired dew point.

The most common method of membrane dryer shutdown is to turn off the gas supply and let the pressure decrease to atmospheric. To efficiently operate the membrane dryer module in cyclical or intermittent service, U.S. Pat. No. 5,030,251 discusses using dry product backflow on the nonpermeate side of the dryer module either under pressure or at low pressure to dry out the moisture front in the membrane during shutdown. This method uses product from the nonpermeate side of the dryer module to back purge the nonpermeate side of the same to dehydrate the membrane.

None of these methods, however, is directed to improving the startup and shut down processes for a gas separation system with a membrane dryer module.

It is an object of the invention to provide improved startup and shut down processes for a membrane system comprising at least one membrane dryer module and at least one gas separation membrane module.

It is another object of the invention to provide membrane systems which are useful for carrying out the improved startup and shutdown processes.

SUMMARY OF THE INVENTION

One aspect of the invention lies in a start-up process for a membrane gas separation system comprising at least one gels separation membrane module having permeate and nonpermeate sides and at least one membrane dryer module having permeate and nonpermeate sides, with said at least one gas separation membrane module being capable of separating at least one gas component from a gas mixture and said at least one membrane dryer module being capable of separating wet components from said gas mixture.

The first start-up process comprises:
 (a) pressurizing said at least one membrane dryer module and said at least one gas separation membrane module at the same time at a rate of 10 psi per second through passing a pressurized gas mixture into said nonpermeate sides of said at least one gas separation membrane module and said at least one membrane dryer module;
 (b) permeating at least one gas component of said gas mixture from the nonpermeate side of said gas separation membrane module to the permeate side of said gas separation membrane module; and
 (c) passing at least a portion of the permeated gas component from step (b) to the permeate side of said membrane dryer module.

The second start-up process comprises:
 (a) passing a pressurized gas mixture into said nonpermeate side of said at least one membrane dryer module to pressurize said at least one membrane dryer module;
 (b) passing at least a portion of the pressurized gas mixture from said nonpermeate side of said at least one membrane dryer module or a dry gas stream from an external source to said permeate side of said at least one membrane dryer module to purge any moisture in said permeate side of said membrane dryer module;
 (c) passing at least a portion of the pressurized gas mixture from said nonpermeate side of said at least one membrane dryer module to the nonpermeate side of said at least one gas separation module;
 (d) permeating at least one gas component of said gas mixture from said nonpermeate side of said at least one gas separation membrane module to the permeate side of said at least one gas separation membrane module;

(e) passing at least a portion of the permeated gas from the permeate side of said at least one gas separation membrane module to the permeate side of said at least one membrane dryer module, when said at least one gas separation membrane module reaches its operating pressure and temperature.

The third start-up process comprises:

(a) passing a pressurized gas mixture into said nonpermeate side of said at least one membrane dryer module to pressurize said at least one membrane dryer module;

(b) passing at least a portion of the pressurized gas mixture from said nonpermeate side of said at least one membrane dryer module or a dry gas stream from an external source to said permeate side of said at least one membrane dryer module to purge any moisture in said permeate side of said at least one membrane dryer module;

(c) venting any remaining pressurized gas mixture from said nonpermeate side of said at least one membrane dryer module until said pressurized gas mixture from said nonpermeate side of said at least one membrane dryer module reaches a preselected dew point;

(d) passing at least a portion of the pressurized gas mixture having said preselected dew point from said nonpermeate side of said at least one membrane dryer module to the nonpermeate side of said at least one gas separation membrane module; and (e) passing at least a portion of any gas permeated to the permeate side of said at least one gas separation membrane module from said nonpermeate side of said at least one gas separation membrane module to the permeate side of said at least one membrane dryer module to purge any moisture therein when said at least one gas separation membrane module reaches its operating pressure and temperature.

Another aspect of the invention lies in a process for terminating or shutting down a membrane gas separation system comprising at least one gas separation membrane module having permeate and nonpermeate sides and at least one membrane dryer module having permeate and nonpermeate sides, with said at least one gas separation membrane module being capable of separating at least one gas component from a gas mixture and said at least one membrane dryer module being capable of separating wet components from said gas mixture. The shutting down process comprises:

(a) terminating the flow of a pressurized gas mixture into the nonpermeate sides of both said at least one membrane dryer module and said at least one gas separation membrane module; and (b) depressurizing said at least one membrane dryer module and said at least one gas separation membrane module by removing any pressurized gas mixture in the nonpermeate sides of both said at least one membrane dryer module and said at least one gas separation membrane module from the permeate sides of both said at least one membrane dryer module and said at least one gas separation membrane module.

The above start-up and shut down processes can be carried out in a membrane gas separation system comprising:

(a) at least one compressor or pump means for pressurizing a gas stream;

(b) at least one first conduit means in fluid communication with said at least one compressor or pump means, said at least one first conduit means having at least one first valve or a flow limiting orifice for controlling or terminating the flow of a pressurized gas stream;

(c) at least one membrane dryer module having permeate and nonpermeate sides, said permeate and nonpermeate sides each having at least one inlet and at least one outlet with said at least one inlet of said nonpermeate side in fluid communication with said at least one first conduit means;

(d) at least one second conduit means in fluid communication with said at least one outlet of said at least one membrane dryer module, said at least one second conduit means having at least one second valve for controlling or terminating the flow of a gas stream from the nonpermeate side of said at least one membrane dryer module;

(e) at least one third conduit means in fluid communication with said at least one second conduit means, said at least one third conduit means having at least one valve for venting or not venting a pressurized gas stream in said at least one second conduit means;

(f) at least one gas separation membrane module having permeate and nonpermeate sides, said permeate side having at least one outlet and said nonpermeate side having at least one inlet and at least one outlet, with said at least one inlet of said nonpermeate side in fluid communication with said at least one second conduit means;

(g) at least one fourth conduit means in fluid communication with said at least one outlet of the nonpermeate side of said at least one gas separation membrane module, said at least one fourth conduit means having at least one fourth valve for either terminating or conveying the flow of a product gas stream;

(h) at least one fifth conduit means for connecting said at least one outlet of the permeate side of said at least one gas separation membrane module and said at least one inlet of the permeate side of said at least one membrane dryer module, said at least one fifth conduit means having at least one fifth valve for terminating, controlling or conveying the flow of a gas stream into said permeate side of said at least one membrane dryer module; and (g) at least one sixth conduit means having at least one sixth valve in fluid communication with said at least one fifth conduit means for either venting at least a portion of any gas stream in said at least one fifth conduit means or conveying at least a portion of any gas stream in said at least one fifth conduit means into said at least one first conduit means.

As used herein the term "at least one membrane dryer module" means one or more device having at least one membrane useful for permeating or separating wet components of a gas mixture.

As used herein the term "at least one gas separation membrane module" means one or more device having membrane for separating or permeating at least one gas component from a gas mixture.

As used herein the term "dew point" means temperature at a given pressure wherein water vapor begins to condense. The dew point may be expressed in terms of the water vapor content in a gas stream or membrane modules. The desired dew point is defined as less than 1000 ppm water vapor, preferably less than 250 ppm water vapor in a gas stream or membrane modules.

BRIEF DESCRIPTION OF THE DRAWINGS

FIGS. 1-4 are schematic flow diagrams of various embodiments of the invention for a membrane system comprising at least one membrane dryer module and at least one gas separation membrane module, which can be started up and shut down in an effective and efficient manner.

DETAILED DESCRIPTION OF THE INVENTION

The above objects of the invention are achieved by providing particular pressurization arrangements for a membrane system comprising at least one membrane dryer module and at least one gas separation membrane module and particular purging arrangements for at least one membrane dryer module of the membrane system during the startup operation. The above objects of the invention are also achieved by employing particular depressurizing arrangements for a membrane system comprising at least one membrane dryer module and at least one gas separation membrane module during the shut down process. The particular pressurization, depressurization and purging arrangements allow for, among other things, reduction of the startup time, minimization or prevention of any damage to membrane fibers and prevention of back diffusion of contaminants into the gas separation membrane module.

The invention is hereafter described in detail with respect to the accompanying drawings.

With reference to FIGS. 1-4, a gas mixture is pressurized with a compressor or pump (1) and is fed into the nonpermeate side (11) of a membrane dryer module (9) through a conduit (3) having a valve (7) or a flow limiting orifice (7). The valve (7), such as a slow opening valve and an excess flow check valve, or the orifice (7) may be used to control the rate of pressurization at less than 10 psi per second, preferably at less than 5 psi per second. Alternately, the valve (7) may be used to carry the flow of a pressurized gas mixture to gradually or slowly increase the pressure in the nonpermeate side (11) of the membrane dryer module. By controlling the pressurization rate or gradually or slowly increasing the pressure, any damage to membrane fibers (15) in the membrane dryer module (9) can be either minimized or prevented.

Although the above pressurization methods are preferred, other methods of pressurizing the nonpermeate side (11) of the membrane dryer module (9) can be utilized.

For example, one method of pressurizing the dryer is to start the flow from the dryer simultaneously with the pressure increase. In this method, low pressure gas from the compressor (1) enters and leaves the nonpermeate side (11) of the dryer module (9) with very little moisture permeation until the pressure reaches a high enough level for permeation to start. When the dryer module (9) has been previously operated and the nonpermeated product stream is dry or has been purged dry it is possible for all or some of the moisture in the product stream to be adsorbed by the membrane fiber (15) in the dryer module (9). In this instance a small pulse of high humidity product may exit the nonpermeate side (11) of the dryer module (9). If the downstream gas separation membrane modules (29) can tolerate this product, there is no need for venting. However, if the dryer module (9) has not been previously operated, or has been exposed to high ambient moisture (i.e., the polymer is no longer dehydrated at the start of operation), the duration and level of the product humidity from the nonpermeate side (11) of the dryer module (9) will be greater. In these instances, it may be desirable to vent the dryer product during the initial transient.

Another method of pressurizing the dryer module (9) is to bring it to the desired operating pressure and start the nonpermeate product flow from the nonpermeate side (11) of the dryer module (9). In this case, there will be permeation of moisture during the initial flow period and less moisture will remain in the nonpermeate product than that in the first method. Again, the level of humidity during the initial flow period is dependent upon the prior operating history of the dryer module (9), how it was shutdown, the duration of and the conditions during the shutdown.

An additional method pressurizing the dryer module (9) is to start nonpermeate product flow and pressurization at the same time. However, when the flow reaches a predetermined level, lower than the steady state operating level, it is kept constant during the rest of the transient. This effect increases the area factor of the drying membrane during the initial startup period and can produce a dryer feed to the downstream gas separation membrane modules (29) than when full flow is used.

During the pressurization of the nonpermeate side (11) of the membrane dryer module (9), various gas sources may be used initially to purge the permeate side (13) of the membrane dryer module (9). At least a portion of the pressurized gas mixture leaving the nonpermeate side (11) through a conduit (17), for example, may be supplied to the permeate side (13) of the membrane dryer module (9) through a conduit (19) having a valve (21). Optionally, an external gas source (22), such as a cryogenic liquid tank, may be used to deliver a dry gas to the permeate side (13) of the membrane dryer module (9) to purge the moisture therein. The purge gas and moisture in the permeate side (13) of the membrane dryer module (9) leaves through a conduit (16) having a valve (18). It is desirable to utilize a higher purge flow and cleaning ratio during the initial startup period than is used during the steady state operation. The cleaning ratios (purge ratio times pressure ratio) that would be used during the steady state operation are 0.2-10.0 with the preferred range of 0.5-3.0. The cleaning ratio during the initial startup phase can be increased to decrease the time needed to reach the prescribed dew point for the downstream gas mixture. As used herein the term "purge ratio" means permeate flow and purge gas flow in the permeate side of the membrane dryer module divided by the nonpermeate product flow from the nonpermeate side of the membrane dryer module. As used herein the term "pressure ratio" means a feed gas pressure entering the nonpermeate side divided by a purge pressure in the permeate side of the membrane dryer module.

In one embodiment of the invention as shown in FIG. 1, at least a portion of the pressurized gas mixture exiting the nonpermeate side (11) of the membrane dryer module (9) through the conduit (17) having a valve (31) is delivered through a conduit (19) having a valve (21) and a conduit (23) to purge the permeate side (13) of the membrane dryer module (9). Meanwhile, the remaining pressurized gas mixture in the conduit (17) may be vented through a conduit (25) having a valve (27). Once the pressurized gas mixture from the nonpermeate side (11) of the dryer membrane module (9) reaches the desired dew point, the pressurized gas mixture is delivered to one or more gas separation membrane modules (29) by closing the valve (27) (vent) and opening the valve (31). Purging the permeate side (13) of the membrane dryer module (9) with a pressurized gas mixture in the conduit (17) is maintained. The product gas leaving the nonpermeate side (33) of one or more gas separation modules (29) e.g., at least three gas separation membrane modules, is vented through a conduit (39) having a valve (40) until the desired operating pressure, temperature and product purity are reached. When one or more gas separation membrane modules (29) have reached the desired operating pressure, temperature and product purity, at least a portion of gas components permeated through membrane (35) into the permeate side (37) of one or more gas separation membrane modules (29) is delivered to the permeate side (13) of the membrane dryer module (9) via a conduit (23) having a valve (41). Any undelivered gas components may be vented or recycled through a conduit (43) having an optional valve (45). At this point, the valve (21) is closed, thus preventing the delivery of the pressurized gas mixture in the conduit (17) to the permeate side of the membrane dryer module (9).

This method of starting a membrane dryer and membrane gas separation plant is preferred when the gas separation membranes cannot tolerate a short period of higher than normal humidity operation. This method is useful when the membrane dryer module has not been previously operated or has not been operated for a long period of time (e.g. a month) and has been exposed to ambient moisture. In these cases, the dryer membrane material (15) has a high level of moisture along the entire axial length and the moisture at the product end needs to be removed before the dryer module (9) can produce a gas having the specified dew point. During the first step of bringing the dryer module (9) to the desired dew point while venting, it is possible, and even desirable, to utilize a lower product flow from the dryer module (9) while it is being vented. It is also preferable to use a higher cleaning ratio than the steady state values.

In an alternative embodiment as shown in FIG. 2, an external dry gas source (22) is used to purge the permeate side (13) of the membrane dryer module (9). The external dry gas source (22) can be selected from, among other things, a cryogenic liquid tank. The cryogenic liquid, for example, can be vaporized and supplied to the permeate side (13) of the membrane dryer module (9) through a conduit (47) which is in fluid communication with the conduit (23) and/or the conduit (19). In the meantime, the pressurized gas mixture delivered to the nonpermeate side (11) of the membrane dryer module (9) is vented via a conduit (17) and a conduit (25). Once the gas mixture in the nonpermeate side (11) of the membrane dryer module (9) reaches the desired dew point, the gas mixture is delivered to the nonpermeate side (33) of at least one gas separation membrane module (29) by opening the valve (31) and closing the valve (27). The product gas from the nonpermeate side (33) of at least one gas separation membrane module (29) is vented until its steady state operating pressure, temperature and product purity conditions are reached. Upon reaching such conditions, at least a portion of the permeated gas stream in the permeate side (37) of the at least one gas separation membrane module (29) is supplied to the permeate side (13) of the membrane dryer module (9). The dry gas stream from the external dry gas source (22) may be or may not be shut off. Depending on the source involved, it may be desirable to continue using the external purge gas even after the gas separation membrane modules (29) have reached the desired temperature and pressure. In this instance, the additional back pressure on the gas separation membrane modules (29) can be avoided, leading to better performance of the gas separation membrane module (29). A variation of this method is to operate the system with a small product flow during the startup while still employing an external purge. This can help bring the gas separation system to the desired temperature faster, while setting up the moisture front in the dryer module (9). This also helps the membrane dryer module (9) reach the prescribed level of dryness sooner than when operating with full product flow. Another method of using an external purge is to have no product flow while setting up the moisture front in the dryer module (9). Again, for both of these methods, after the dryer module (9) has reached the desired conditions, full flow is sent to the gas separation membrane modules (29). When the system has reached the desired steady state operating conditions, the permeate streams from the gas separation membrane modules (29) may be used to purge the permeate side (13) of the dryer module (9). The external dry gas source (22) is then shut off.

Another method of starting up a membrane system comprising at least one gas separation membrane module (29) and at least one membrane dryer module (9) include passing a pressurized gas mixture into the nonpermeate side (11) of the membrane dryer module (9), purging the permeate side (13) of the membrane dryer module (9) with the gas mixture from the nonpermeate side (11) or the external gas source (22) and passing any unused gas mixture from the nonpermeate side (11) of the membrane dryer module (9) to the nonpermeate side (33) of at least one gas separation membrane module (29).

The product from the nonpermeate side (33) of the gas separation membrane module (29) is vented until it is brought to its desired steady state operating pressure, temperature and purity. When the gas separation membrane module (29) has reached the desired operating temperature and pressure, a portion of the permeate stream from the gas separation membrane module (29) can be used to purge the permeate side (13) of the dryer module (9). The purge gas from the nonpermeate side (11) or the external source (22) can be shut off. This method is useful when the dryer module (9) has previously been operated and will reach its desired dew point in a short period of time. However, this method can allow a small pulse of high humidity feed to reach the gas separation membrane module (29). A low product flow and/or a higher purge from the dryer module (9) during the initial transient may be utilized to minimize any pulses of high humidity feed to the gas separation membrane module (29). It is understood that this method can also be carried out without purging the permeate side (13) of the membrane dryer module (9).

After the startup of the membrane system, the membrane system may be conventionally operated, e.g., U.S. Pat. Nos. 4,931,070, 5,102,432 and 5,169,412. At one point, the operation of the membrane system, however, needs to be terminated. Typically, the gas separation membrane modules (29) and the membrane dryer module (9) are shut down by turning off the compressor or pump (1) and releasing or bleeding a pressurized gas mixture in the nonpermeate sides (33) of the gas separation membrane modules (29) and the membrane dryer module (9) through the conduits (39 and 25) (retentate (product) bleeddown). Of course, the use of a conduit (49) having a valve (51) increases the rate of depressurization of the dryer module (9). It has been found, however, that a greater amount of moisture in the membrane dryer module (9) can be removed if the pressurized gas in the nonpermeate side (11) of the membrane dryer module (9) is removed from the permeate side (13) of the membrane dryer module (9). This shut down process can be extended to the gas separation membrane module. At least a portion of the gas stream permeated to the permeate side (37) of the gas separation membrane module (29), however, may be supplied to the permeate side (13) of the membrane dryer module (9) as shown by FIG. 3. Alternatively, the nonpermeate and permeate sides (11 and 13) of the membrane dryer module (9) may be purged with a dry gas stream from the external dry gas source (22) during the shut down as shown by FIG. 4. This approach enables the membrane dryer module (9) to reach the desired dew point faster during restart. In either instance, it is desirable to employ adsorbent traps (55), e.g. zeolites, in the conduit (23), the permeate line, to prevent any back diffusion of contaminants, such as moisture, from the ambient surroundings during shut down period. The adsorbents can be regenerated by passing a clean and dry gas during the steady state (normal continuous) operation. If the membrane system is to be shut down for a short period or is operating intermittently, the membrane system may be bottled up by closing the valves (7, 18, 21, 27, 40, 41, 45, and 51). The membrane system can be isolated from any back diffusion of contaminants, such as moisture, from the ambient surroundings. Moreover, the dryer module (9) can be restarted in a short period because the desired dew point can be reached quickly.

The membrane system frequently employs a gas mixture pretreatment means (5 and/or 53) containing filtering means for removing moisture or adsorbents, such as activated carbon particles, for removing contaminants, such as hydrocarbon vapors, from a gas mixture, e.g., air. The pretreatment means (53) normally contains activated carbon particles to remove hydrocarbon vapors, thus minimizing damage to one or more gas separation membrane modules (29). The carbon particles can be activated by equilibrating with a gas at less than 50% relative humidity. It is, however, possible to activate these carbon particles in-situ by locating them upstream of the membrane dryer module vent and venting until the desired dew point is reached.

The present invention can employ any useful gas separation membrane materials in one or more gas separation membrane modules. Among the existing materials, the polymeric membrane materials are generally desired. It has been found, however, that certain polymeric membrane materials, such as lithium exchanged sulfonated aromatic polymer materials, have a low tolerance for moisture. The startup and shut down processes of the present invention is found to solve the problems associated with the hydroscopic nature of the gas separation membrane materials.

By employing the above startup and shutdown processes, various improvements can be obtained. The improvements include, among other things, reduction of the startup time, minimization or prevention of any damage to membrane fibers and prevention of back diffusion of contaminants into the gas separation membrane module from the ambient surroundings. Moreover, the problems associated with employing the membrane materials having a low tolerance for moisture are addressed.

Although the invention has been described in detail with reference to certain specific embodiments, those skilled in the art will recognize that there are other embodiments within the spirit and scope of the claims.

What is claimed is:

1. A start-up process for a membrane gas separation system comprising at least one gas separation membrane module having permeate and nonpermeate sides and at least one membrane dryer module having permeate and nonpermeate sides, with said at least one gas separation membrane module being capable of separating at least one gas component from a gas mixture and said at least one membrane dryer module being capable of separating wet components from said gas mixture, said start-up process comprising the step of:
    (a) pressurizing said at least one membrane dryer module and said at least one gas separation membrane module at the same time at a rate of less than 10 psi per second through passing a pressurized gas mixture into said nonpermeate sides of said at least one gas separation membrane module and said at least one membrane dryer module;
    (b) permeating at least one gas component of said gas mixture from the nonpermeate side of said gas separation membrane module to the permeate side of said gas separation membrane module; and
    (c) passing at least a portion of the permeated gas component from step (b) to the permeate side of said membrane dryer module.

2. The start-up process according to claim 1, wherein said at least one dryer membrane module and said at least one gas separation membrane module are pressurized at a rate of less than 5 psi per second.

3. The start-up process according to claim 1, further comprising passing a dry gas stream from an external source into the permeate side of said at least one membrane dryer module to purge any moisture therein.

4. A start-up process for a membrane gas separation system comprising at least one gas separation membrane module having permeate and nonpermeate sides and at least one membrane dryer module having permeate and nonpermeate sides, with said at least one gas separation membrane module being capable of separating at least one gas component from a gas mixture and said at least one membrane dryer module being capable of separating wet components from said gas mixture, said start-up process comprising:
    (a) passing a pressurized gas mixture into said nonpermeate side of said at least one membrane dryer module to pressurize said at least one membrane dryer module;
    (b) passing at least a portion of the pressurized gas mixture from said nonpermeate side of said at least one membrane dryer module or a dry gas stream from an external source to said permeate side of said at least one membrane dryer module to purge any moisture in said permeate side of said membrane dryer module;
    (c) passing at least a portion of the pressurized gas mixture from said nonpermeate side of said at least one membrane dryer module to the nonpermeate side of said at least one gas separation module;

(d) permeating at least one gas component of said gas mixture from said nonpermeate side of said at least one gas separation membrane module to the permeate side of said at least one gas separation membrane module;

(e) passing at least a portion of the permeated gas from the permeate side of said at least one gas separation membrane module to the permeate side of said at least one membrane dryer module, when said at least one gas separation membrane module reaches its operating pressure and temperature.

5. The start-up process according to claim 4, further comprising terminating the flow of said pressurized gas mixture from the nonpermeate side of said at least one membrane dryer module into the permeate side of said at least one membrane dryer module upon purging the moisture on the permeate side of the membrane in said at least one membrane dryer module and/or terminating the flow said dry gas from said external source upon purging the moisture on said permeate side of the membrane in said at least one membrane dryer module.

6. A start-up process for a membrane gas separation system comprising at least one gas separation membrane module having permeate and nonpermeate sides and at least one membrane dryer module having permeate and nonpermeate sides, with said at least one gas separation membrane module being capable of separating at least one gas component from a gas mixture and said at least one membrane dryer module being capable of separating wet components from said gas mixture, said start-up process comprising:

(a) passing a pressurized gas mixture into said nonpermeate side of said at least one membrane dryer module to pressurize said at least one membrane dryer module;

(b) passing at least a portion of the pressurized gas mixture from said nonpermeate side of said at least one membrane dryer module or a dry gas stream from an external source to said permeate side of said at least one membrane dryer module to purge any moisture in said permeate side of said at least one membrane dryer module;

(c) venting any remaining pressurized gas mixture from said nonpermeate side of said at least one membrane dryer module until said pressurized gas mixture from said nonpermeate side of said at least one membrane dryer module reaches a preselected dew point;

(d) passing at least a portion of the pressurized gas mixture having said preselected dew point from said nonpermeate side of said at least one membrane dryer module to the nonpermeate side of said at least one gas separation membrane module; and (e) passing at least a portion of any gas permeated to the permeate side of said at least one gas separation membrane module from said nonpermeate side of said at least one gas separation membrane module to the permeate side of said at least one membrane dryer module to purge any moisture therein when said at least one gas separation membrane module reaches its operating pressure and temperature.

7. The start-up process according to claim 6, further comprising using a cleaning ratio which is higher than that employed in steady state operation.

8. The start-up process according to claim 6, wherein said at least one membrane dryer module is pressurized at a rate of less than 10 psi per second.

9. The start-up process according to claim 6, wherein said at least one membrane dryer module is pressurized at a rate of less than 5 psi per second.

10. The start-up process according to claim 9, wherein the rate of pressurization of said at least one membrane dryer module is controlled by passing said pressurized gas mixture into the nonpermeate side of said membrane dryer module through a flow limiting orifice, a slow opening valve and/or an excess flow check valve.

11. A process for terminating or shutting down a membrane gas separation system comprising at least one gas separation membrane module having permeate and nonpermeate sides and at least one membrane dryer module having permeate and nonpermeate sides, with said at least one gas separation membrane module being capable of separating at least one gas component from a gas mixture and said at least one membrane dryer module being capable of separating wet components from said gas mixture, said process comprising:

(a) terminating the flow of a pressurized gas mixture into the nonpermeate sides of both said at least one membrane dryer module and said at least one gas separation membrane module; and (b) depressurizing said at least one membrane dryer module and said at least one gas separation membrane module by removing any pressurized gas mixture in the nonpermeate sides of both said at least one membrane dryer module and said at least one gas separation membrane module from the permeate sides of both said at least one membrane dryer module and said at least one gas separation membrane module through permeating said any pressurized gas mixture from said nonpermeate sides to said permeate sides.

12. The process according to claim 11, further comprising passing a dry gas stream into the permeate and nonpermeate sides of said at least one membrane dryer module to purge any moisture therein.

13. The process according to claim 11, further comprising providing adsorbents at the outlet of the permeate side of said at least one gas separation membrane module to prevent back diffusion of contaminants.

14. A membrane gas separation system comprising:

(a) at least one compressor or pump means for pressurizing a gas stream;

(b) at least one first conduit means in fluid communication with said at least one compressor or pump means, said at least one first conduit means having at least one first valve or a flow limiting orifice for controlling or terminating the flow of a pressurized gas stream;

(c) at least one membrane dryer module having permeate and nonpermeate sides, said permeate and nonpermeate sides each having at least one inlet and at least one outlet with said at least one inlet of said nonpermeate side in fluid communication with said at least one first conduit means;

(d) at least one second conduit means in fluid communication with said at least one outlet of said at least one membrane dryer module, said at least one second conduit means having at least one second valve for controlling or terminating the flow of a gas stream from the nonpermeate side of said at least one membrane dryer module;

(e) at least one third conduit means in fluid communication with said at least one second conduit means, said at least one third conduit means having at least one valve for venting or not venting a pressurized gas stream in said at least one second conduit means;

(f) at least one gas separation membrane module having permeate and nonpermeate sides, said permeate side having at least one outlet and said nonpermeate side having at least one inlet and at least one outlet, with said at least one inlet of said nonpermeate side in fluid communication with said at least one second conduit means;

(g) at least one fourth conduit means in fluid communication with said at least one outlet of the nonpermeate side of said at least one gas separation membrane module, said at least one fourth conduit means having at least one fourth valve for either terminating or conveying the flow of a product gas stream;

(h) at least one fifth conduit means for connecting said at least one outlet of the permeate side of said at least one gas separation membrane module and said at least one inlet of the permeate side of said at least one membrane dryer module, said at least one fifth conduit means having at least one fifth valve for terminating, controlling or conveying the flow of a gas stream into said permeate side of said at least one membrane dryer module; and (g) at least one sixth conduit means having at least one sixth valve in fluid communication with said at least one fifth conduit means for either venting at least a portion of any gas stream in said at least one fifth conduit means or conveying at least a portion of any gas stream in said at least one fifth conduit means into said at least one first conduit means.

15. The gas separation membrane system according to claim 14, wherein said at least one gas separation membrane module is at least three gas separation membrane modules.

16. The gas separation membrane system according to claim 14, further comprising at least one seventh conduit means for connecting said at least one second conduit means and said at least one fifth conduit means, wherein said at least one seventh conduit means has at least one seventh valve for terminating, controlling or conveying the flow of a gas stream from said at least one fifth conduit means to said at least one second conduit means.

17. The gas separation membrane system according to claim 16, further comprising at least one external dry gas source in fluid communication with said at least one seventh conduit means or said at least one fifth conduit means.

18. The gas separation membrane system according to claim 14, further comprising at least one adsorbent trap which is located at the outlet of the permeate side of said at least one gas separation membrane module.

19. The gas separation membrane system according to claim 14, further comprising at least one pretreatment device containing filtering means for removing moisture, adsorbents or activated carbon particles, which is located at said at least one first conduit means and/or said at least one second conduit means.

20. The gas separation membrane system according to claim 14, wherein said at least one first valve is a slow opening valve and/or an excess flow check valve.

* * * * *